United States Patent
Guo et al.

(10) Patent No.: US 9,215,702 B2
(45) Date of Patent: Dec. 15, 2015

(54) METHOD AND APPARATUS FOR PROCESSING DATA AND BASE STATION

(71) Applicant: Huawei Technologies Co., Ltd., Shenzhen, Guangdong (CN)

(72) Inventors: Zhitao Guo, Shenzhen (CN); Binlin Jiang, Shenzhen (CN); Lichang Wu, Shenzhen (CN); Aihua Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 394 days.

(21) Appl. No.: 13/739,768

(22) Filed: Jan. 11, 2013

(65) Prior Publication Data

US 2013/0136107 A1 May 30, 2013

Related U.S. Application Data

(63) Continuation of application No. PCT/CN2011/075376, filed on Jun. 7, 2011.

(30) Foreign Application Priority Data

Jul. 13, 2010 (CN) .......................... 2010 1 0228177

(51) Int. Cl.
*H04W 4/00* (2009.01)
*H04W 72/04* (2009.01)
(Continued)

(52) U.S. Cl.
CPC ........ *H04W 72/0413* (2013.01); *H04W 88/085* (2013.01); *H04B 1/707* (2013.01)

(58) Field of Classification Search
USPC ......... 370/319, 320, 334, 335, 337, 341, 342, 370/441, 442
See application file for complete search history.

(56) References Cited

U.S. PATENT DOCUMENTS

| 6,970,524 B1 * | 11/2005 | Zeng et al. ..................... 375/347 |
| 7,065,364 B1 * | 6/2006 | Todd .............................. 455/445 |
| 2002/0021686 A1 * | 2/2002 | Ozluturk et al. .............. 370/342 |

FOREIGN PATENT DOCUMENTS

| CN | 1929672 A | 3/2007 |
| CN | 101330400 A | 12/2008 |

(Continued)

OTHER PUBLICATIONS

Rejection Decision in corresponding Chinese Patent Application No. 201010228177.9 (May 6, 2013).
(Continued)

*Primary Examiner* — Zewdu A Beyen
(74) *Attorney, Agent, or Firm* — Leydig, Voit & Mayer, Ltd.

(57) ABSTRACT

The present invention provides a method and an apparatus for processing data and a base station. The method includes: receiving first service data sent by a first radio frequency device, where the first service data are received by at least one receiving set of the first radio frequency device; receiving at least one second service data sent by at least one second radio frequency device, where the at least one second service data are respectively received by at least one receiving set corresponding to the at least one second radio frequency device; and transferring the first service data and the at least one second service data to a baseband processing device through a baseband processing device channel corresponding to the first radio frequency device. The solution according to embodiments of the present invention is capable of effectively using channel resources of a baseband processing device.

11 Claims, 4 Drawing Sheets

(51) Int. Cl.
*H04W 88/08* (2009.01)
*H04B 1/707* (2011.01)

(56) References Cited

FOREIGN PATENT DOCUMENTS

| | | |
|---|---|---|
| CN | 101505500 A | 8/2009 |
| CN | 101534141 A | 9/2009 |
| CN | 101888717 A | 11/2010 |
| EP | 1954075 A1 | 8/2008 |
| EP | 2421174 A1 | 2/2012 |

OTHER PUBLICATIONS

1st Office Action in corresponding Chinese Patent Application No. 201010228177.9 (Feb. 29, 2012).
2nd Office Action in corresponding Chinese Patent Application No. 201010228177.9 (Nov. 5, 2012).
Written Opinion of the International Searching Authority in corresponding PCT Patent Application No. PCT/CN2011/075376 (Sep. 8, 2011).
International Search Report in corresponding PCT Patent Application No. PCT/CN2011/075376 (Sep. 8, 2011).

* cited by examiner

METHOD AND APPARATUS FOR PROCESSING DATA AND BASE STATION

CROSS-REFERENCE TO RELATED APPLICATIONS

This application is a continuation of International Patent Application No. PCT/CN2011/075376, filed on Jun. 7, 2011, which claims priority to Chinese Patent Application No. 201010228177.9, filed on Jul. 13, 2010, both of which are hereby incorporated herein by reference in their entireties.

FIELD OF TECHNOLOGY

Embodiments of the present invention relate to the field of radio communication technologies, and in particular, to a method and an apparatus for processing data and a base station.

BACKGROUND

In Code Division Multiple Access (CDMA) radio communication technologies, in order to increase signal coverage areas in regions such as buildings, tunnels, high-speed trains, and the like, a method of a carrier frequency with same pseudo-noise (PN) is normally used to solve the problem of blind coverage areas.

In the carrier frequency technology with same PN, a CDMA base station contains a radio frequency device and a baseband processing device. The baseband processing device uses a mode of centralized processing and is placed in a central machine room. The radio frequency device in an optical fiber base station is placed at a remote end to expand the coverage area of the base station, and the radio frequency device placed at the remote end may also be referred to as a remote radio unit (RRU). On a downlink direction from the base station to a terminal, first, the baseband processing device transmits service data under a carrier frequency with same PN by using the radio frequency device; a power amplifier and a splitter respectively amplifies and splits signals; and finally split service data are transmitted out by using antennas in different sectors. On an uplink direction from the terminal to the base station, service data received from antennas corresponding to various radio frequency devices in every sector are transferred to the baseband processing device for processing through a corresponding baseband processing device channel between each radio frequency device and the baseband processing device.

During the implementation of the present invention, the inventors find that the prior art has at least the following problem: in the existing carrier frequency technology with same PN, when transferring uplink service data, every radio frequency device, even for receiving uplink data by using a single set, occupies one baseband processing device channel in the transferring process from the radio frequency device to the baseband processing device, resulting in waste of baseband processing device channel resources.

SUMMARY

Embodiments of the present invention provide a method and an apparatus for processing data and a base station, thereby solving the problem of waste of baseband processing device channel resources and effectively using channel resources of the baseband processing device.

Embodiments of the present invention provide a method for processing data, which is used in processing uplink data of a Code Division Multiple Access base station, including:

receiving first service data sent by a first radio frequency device, where the first service data are received by at least one receiving set of the first radio frequency device;

receiving at least one second service data sent by at least one second radio frequency device, where the at least one second service data are respectively received by at least one receiving set corresponding to the at least one second radio frequency device;

if there is at least one idle receiving set in the first radio frequency device, merging the at least one second service data with the first service data, so that the at least one second service data are regarded as service data received by the at least one idle receiving set of the first radio frequency device, where the number of the at least one second service data equals to the number of the at least one idle receiving set; and transferring the first service data and the at least one second service data to a baseband processing device through a baseband processing device channel corresponding to the first radio frequency device.

Embodiments of the present invention provide an apparatus for processing data, which is used to process uplink data of a Code Division Multiple Access base station, including:

a first receiving device configured to receive first service data sent by a first radio frequency device, where the first service data are received by at least one receiving set of the first radio frequency device;

at least one second receiving device configured to receive at least one second service data sent by at least one second radio frequency device, where the at least one second service data are respectively received by at least one receiving set corresponding to the at least one second radio frequency device;

a processing device configured to, if there is at least one idle receiving set in the first radio frequency device, merge the at least one second service data with the first service data, so that the at least one second service data are regarded as service data respectively received by the at least one idle receiving set of the first radio frequency device, where the number of the at least one second service data equals to the number of the at least one idle receiving set; and a transferring device configured to transfer the first service data and the at least one second service data to a baseband processing device through a baseband processing device channel corresponding to the first radio frequency device.

Embodiments of the present invention further provide a base station, including a first radio frequency device, at least one second radio frequency device, a baseband processing device, and a data processing apparatus.

The data processing apparatus is configured to receive first service data sent by the first radio frequency device, where the first service data are received by at least one receiving set of the first radio frequency device; receive at least one second service data sent by at least one second radio frequency device, where the at least one second service data are respectively received by at least one receiving set corresponding to the at least one second radio frequency device; if there is at least one idle receiving set in the first radio frequency device, merge the at least one second service data with the first service data, so that the at least one second service data are regarded as service data respectively received by the at least one idle receiving set of the first radio frequency device, where the number of the at least one second service data equals to the number of the at least one idle receiving set; and transfer the first service data and the at least one second service data to the baseband processing device through a baseband processing device channel corresponding to the first radio frequency device.

The method and apparatus for processing data and the base station according to embodiments of the present invention, by transferring service data of at least two radio frequency devices to a baseband processing device through a baseband processing device channel corresponding to the same radio frequency device, are capable of effectively using channel resources of the baseband processing device, thereby facilitating further expanding capacity of a CDMA base station.

BRIEF DESCRIPTION OF THE DRAWINGS

In order to illustrate the technical solutions in embodiments of the present invention or the prior art more clearly, accompanying drawings needed in the embodiments or the prior art are illustrated briefly in the following. It is evident that the accompanying drawings are only some embodiments of the present invention, and persons of ordinary skill in the art may obtain other drawings according to the accompanying drawings without creative efforts.

DETAILED DESCRIPTION

To make the objective, technical solutions, and advantages of embodiments of the present invention clearer, the technical solutions in the embodiments of the present invention are clearly and fully described in the following with reference to the accompanying drawings in the embodiments of the present invention. Obviously, the embodiments to be described are only a part rather than all of the embodiments of the present invention. Based on the embodiments of the present invention, all other embodiments obtained by persons of ordinary skill in the art without creative efforts shall fall within the protection scope of the present invention.

Figure 1:
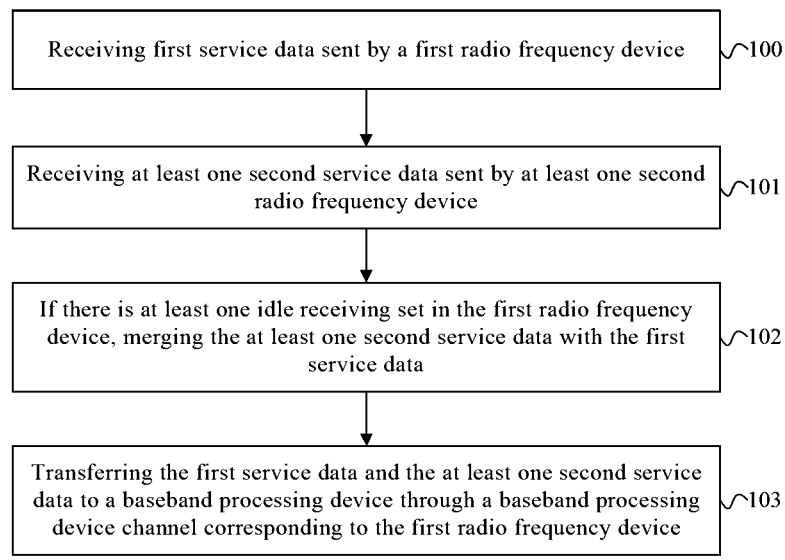
FIG. 1 is a flowchart of a method for processing data according to an embodiment of the present invention.

FIG. 1 is a flowchart of a method for processing data according to an embodiment of the present invention. The method for processing data according to the embodiment is suitable for processing uplink data of a CDMA base station. An execution entity of the method for processing data according to the embodiment is a data processing apparatus. As shown in FIG. 1, the method for processing data according to the embodiment may specifically include the following steps.

Step 100. receiving first service data sent by a first radio frequency device.

Step 101. receiving at least one second service data sent by at least one second radio frequency device.

The step 100 and step 101 may be executed simultaneously.

Specifically, the method for processing data according to the embodiment is suitable for the carrier frequency technology with same PN, and in particular, for the uplink where service data is sent from a terminal to a CDMA base station. After a radio frequency device in the CDMA base station receives service data through at least one receiving set, the data processing apparatus in the embodiment receives the first service data sent by the first radio frequency device, where the first service data are received by the receiving set of the first radio frequency device. Meanwhile, the data processing apparatus also receives the at least one second service data sent by the at least one second radio frequency device, where the at least one second service data are respectively received by at least one receiving set corresponding to the at least one second radio frequency device. The first radio frequency device and the at least one second radio frequency device are in the same carrier frequency with same PN. Every radio frequency device may have an even number of receiving sets, such as two, four, or six. Every radio frequency device may use one or more of the receiving sets to receive service data during the operation process. Therefore, in the embodiment, the received first service data which are sent by the first radio frequency device is service data received by one receiving set of the first radio frequency device, or may be service data received by multiple receiving sets of the first radio frequency device. Similarly, in the embodiment, the received at least one second service data which are sent by the at least one second radio frequency device may be service data received by one receiving set of each second radio frequency device, or may be service data received by multiple receiving sets of each radio frequency device. However, it needs to be ensured that at least one receiving set in every second radio frequency device is in working state. That is, at least one receiving set in every radio frequency device receives service data.

In the embodiment, when every second radio frequency device receives data through one receiving set, the number of the at least one second radio frequency device equals to the number of the at least one second service data. When one of the second radio frequency device receives data through more than one receiving set, the number of the at least one second radio frequency device is smaller than the number of the at least one second service data. However, it must be ensured that the number of the at least one second service data always equals to the number of at least one idle receiving set of the first radio frequency device.

The first radio frequency device and the at least one second radio frequency device in the embodiment are radio frequency devices under a carrier frequency with same PN. The first service data and the second service data in the embodiment are also referred to as IQ data in the industry.

Step 102. if there is at least one idle receiving set in the first radio frequency device, merging the at least one second service data with the first service data, so that the at least one second service data are regarded as service data respectively received by the at least one idle receiving set of the first radio frequency device.

Specifically, the data processing apparatus receives the service data which are sent by every radio frequency device and which is received by the radio frequency device through multiple receiving sets corresponding thereto. Then, the carrier frequency service data needs to be sent to a baseband processing device for processing by the baseband processing device. In the embodiment, when the first radio frequency device, besides the receiving set which receives the first service data, also includes at least one idle receiving set, in order to effectively use channel resources of the baseband processing device, the at least one second service data received by the receiving set of the other at least one second radio frequency device may be regarded as the service data respectively received by the at least one idle receiving set of the first radio frequency device.

Step 103. transferring the first service data and the at least one second service data to the baseband processing device through a baseband processing device channel corresponding to the first radio frequency device.

Specifically, after the at least one second service data are regarded as the service data received by the at least one idle set of the first radio frequency device, it is equivalent that all receiving sets of the first radio frequency device are receiving service data. Correspondingly, now, it is equivalent that the data processing apparatus is receiving the first service data and the at least second service data sent by the first radio frequency device. Then, the first service data and the at least one second service data are transferred to the baseband processing device for processing by the baseband processing device through the baseband processing device channel corresponding to the first radio frequency device.

The method for processing data according to the embodiment of the present invention, by transferring service data of at least two radio frequency devices to the baseband processing device through the baseband processing device channel corresponding to the same radio frequency device, is capable of effectively using channel resources of the baseband processing device, thereby saving the channel resources of the baseband processing device and facilitating further expanding capacity of the base station.

It should be noted that in the above embodiment, the at least one second service data and the first service data are merged in the baseband processing device channel corresponding to the first radio frequency device according to a preset fixed data format for transmission. The fixed data format indicates that, in the baseband processing device channel corresponding to the first radio frequency device, the at least one second service data are regarded as the service data received by the at least one idle set of the first radio frequency device, and in a position in the baseband processing device channel corresponding to the service data corresponding to the at least one idle set, the at least one second service data are merged in the baseband processing device channel.

On the basis of the above embodiment, when one or multiple idle receiving sets of the at least one idle receiving set in the first radio frequency device receive third service data, correspondingly, the second service data which are regarded as received by the idle receiving set cannot be regarded as the service data received by the idle receiving set of the first radio frequency device any longer. For the convenience of description, assume that a receiving set A is an idle receiving set of the first radio frequency device and a receiving set B is a receiving set in working state of the first radio frequency device. When the receiving set A is idle, second service data received by a receiving set of a second radio frequency device C are regarded as serviced data received by the receiving set A, and the second service data and the first service data received by the receiving set B are transferred to a baseband processing device together through a baseband processing device channel corresponding to the first radio frequency device. When the receiving set A receives third service data, in such cases, the second service data received by the receiving set of the second radio frequency device C cannot be regarded as the service data received by the receiving set A of the first radio frequency device. The data processing apparatus transfers the first service data and the third service data together to the baseband processing device through the baseband processing device channel corresponding to the first radio frequency device.

After the processing mentioned above, if there is an idle receiving set still in the first radio frequency device, step 100 to step 103 in the above embodiment are implemented for processing.

On the basis of the above embodiment, another preferable solution is that, if there is at least one idle receiving set in a first radio frequency device, at least one second service data are regarded as service data respectively received by the at least one idle receiving set of the first radio frequency device. Specifically, if there is at least one idle receiving set in the first radio frequency device, at least one second service data are stored in a receiving device respectively corresponding to the at least one idle receiving set of the first radio frequency device, and regarded as the service data respectively received by the at least one idle receiving set of the first radio frequency device.

Specifically, for the convenience of understanding, in the processing apparatus, the service data which are sent by the radio frequency devices and received by each receiving set of the radio frequency devices are stored in a corresponding receiving device. In other words, the data processing apparatus has one receiving device corresponding to every receiving set of every radio frequency device. However, the receiving device corresponding to the receiving set receives corresponding service data only when the receiving set of the radio frequency device receives the service data. For example, if there is at least one idle receiving set in the first radio frequency device, at least one second service data are stored in a receiving device respectively corresponding to the at least one idle receiving set of the first radio frequency device, and are regarded as the service data respectively received by the at least one idle receiving set of the first radio frequency device.

It should be noted that in the above embodiment, the at least one second radio frequency device is a radio frequency device whose time delay is closest to the first radio frequency device. In other words, when data are merged in the baseband processing device channel corresponding to the first radio frequency device, the second radio frequency device is selected according to a reverse time delay to the first radio frequency device in an increasing sequence, thereby ensuring a minimum reverse time delay among the radio frequency devices, which facilitates more effectively time delay compensation after the baseband processing device receives the service data.

Figure 2:
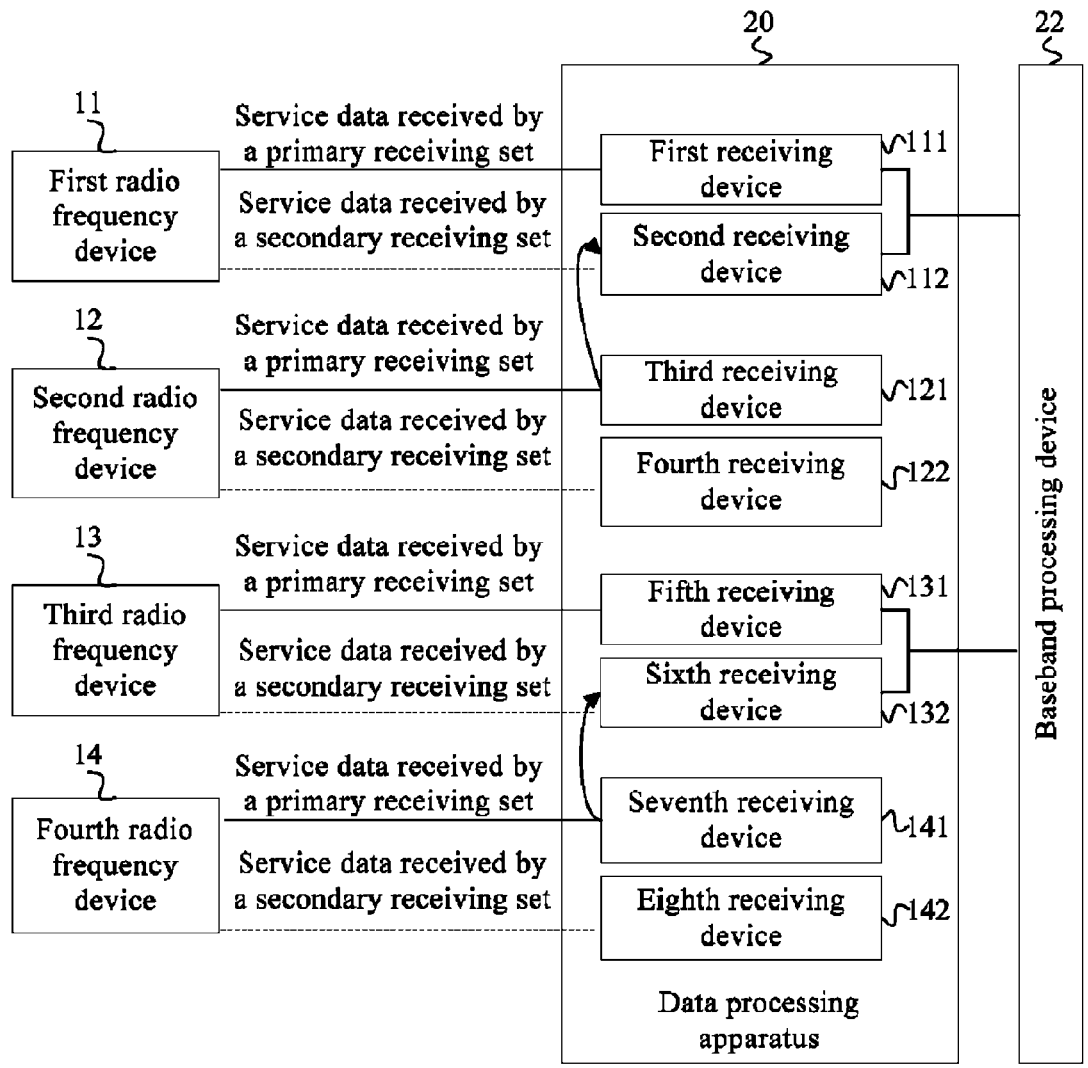
FIG. 2 is a schematic diagram of another method for processing data according to an embodiment of the present invention.

FIG. 2 is a schematic diagram of another method for processing data according to an embodiment of the present invention. As shown in FIG. 2, the embodiment describes the technical solution of the embodiment according to the present invention in detail by using 4 radio frequency devices each of which includes 2 receiving sets under the carrier frequency with same PN as an example.

As shown in FIG. 2, in the embodiment, two receiving sets in every radio frequency device may be respectively referred to as a primary set and a secondary set. In the embodiment, the radio frequency devices receive service data by using only the primary set. A first radio frequency device 11, a second radio frequency device 12, a third radio frequency device 13, and a fourth radio frequency device 14 receive service data respectively by using a primary set thereof. Then, four received service data are sent to a data processing apparatus 20. A receiving device corresponding to every receiving set of the radio frequency devices is set in the data processing apparatus 20, which is configured to receive the service data received by the receiving set of the radio frequency device.

As shown in FIG. 2, for each of the first radio frequency device 11 to the fourth radio frequency device 14, the data processing apparatus 20 has two corresponding receiving devices, where respectively are a first receiving device 111 corresponding to the primary set of the first radio frequency device 11 and a second receiving device 112 corresponding to the secondary set, a third receiving device 121 corresponding to the primary set of the second radio frequency device 12 and a fourth receiving device 122 corresponding to the secondary set, a fifth receiving device 131 corresponding to the primary set of the third radio frequency device 13 and a sixth receiving device 132 corresponding to the secondary set, and a seventh receiving device 141 corresponding to the primary set of the fourth radio frequency device 14 and an eighth receiving device 142 corresponding to the secondary set.

In the embodiment, only the primary sets of the radio frequency devices are used to receive service data. As a result, in the data processing apparatus 20, only the first receiving device 111, the third receiving device 121, the fifth receiving device 131, and the seventh receiving device 141 corresponding to the primary sets of the four radio frequency devices receive service data. The secondary receiving device 112, the fourth receiving device 122, the sixth receiving device 132, and the eighth receiving device 142 corresponding to the secondary sets of the four radio frequency devices receive no service data, and are in an idle state. In the prior art, the service data correspondingly received by every radio frequency device need to be transferred to the baseband processing device 22 through a baseband processing device channel corresponding to the radio frequency device. Four radio frequency devices need to occupy four corresponding baseband processing device channels to transfer the service data received by the radio frequency devices to the baseband processing device 22. Because the baseband processing device channel resource is a bottleneck for expanding the capacity of a CDMA base station in the carrier frequency technology with same PN, when every radio frequency device uses only one receiving set to receive service data, every radio frequency device still occupies one baseband processing device channel, resulting in waste of the baseband processing device channel resources.

As shown in FIG. 2, in the embodiment, the service data in the radio frequency device whose reverse time delay is closest are selected to be merged. For example, the second radio frequency device 12 is a radio frequency device whose reverse time delay is closest to the first radio frequency device 11. The service data received by the third receiving device 121 in the data processing apparatus 20 corresponding to the primary set of the second radio frequency device 12 are stored in the second receiving device 112 corresponding to the secondary set of the first radio frequency device 11, and are regarded as the service data received by the secondary set of the first radio frequency device 11. The fourth radio frequency device 14 is a radio frequency device whose reverse time delay is closest to the third radio frequency device 13. The service data received by the seventh receiving device 141 in the data processing apparatus 20 corresponding to the primary set of the fourth radio frequency device 14 are stored in the sixth receiving device 132 corresponding to the secondary set of the third radio frequency device 13, and are regarded as the service data received by the secondary set of the third radio frequency device 13. In such cases, the service data to be transferred to the baseband processing device 22 by the second radio frequency device 12 and the fourth radio frequency device 14 are respectively merged into the baseband processing device channels corresponding to the first radio frequency device 11 and the third radio frequency 13 and transferred to the baseband processing device 22, which effectively saves channel resources of the baseband processing device and is capable of further expanding the capacity of the CDMA base station under the carrier frequency with same PN.

It should be noted that after the baseband processing device 22 receives such service data under the carrier frequency with same PN, it may select the one with minimum reverse time delay from such service data for time delay compensation. Relevant existing technologies may be referred to for specific solutions of reverse time delay compensation.

When the secondary set of the first radio frequency device 11 starts to receive data, preferably, and the corresponding second receiving device 112 receives service data, in such cases, the service data received by the third receiving device 121 corresponding to the primary set of the second radio frequency device 12 are no longer stored in the second receiving device 112 corresponding to the secondary set of the first radio frequency device 11, while the data processing apparatus 20 transfers the service data received by the second receiving device 112 and the service data received by the first receiving device 111 to the baseband processing device 22 through the baseband processing device channel corresponding to the first radio frequency device 11. The service data received by the primary set of the second radio frequency device 12 may be stored in a receiving device corresponding to an idle receiving set of another radio frequency device, or be stored in the third receiving device 121 corresponding to the primary set of the second radio frequency device 12, and will not be moved for storage.

The method for processing data according to the embodiment, if there is an idle receiving set in every radio frequency device, is capable of effectively saving channel resources of the baseband processing device, which well supports the capacity expansion of a CDMA base station in the carrier frequency technology with same PN.

It should be noted that on the basis of the above embodiment, every radio frequency device may also include an even number of receiving sets, such as four or six. Correspondingly, a receiving device for every receiving set of every radio frequency device is set in the data processing apparatus 20 for receiving service data received by the receiving set. If there is an idle receiving set in every radio frequency device, correspondingly, the receiving device corresponding to the idle receiving set in the data processing apparatus 20 is also in an idle state. On the principle of minimizing baseband processing device channel resources, service data storage is moved in the data processing apparatus 20. That is, service data received by a receiving device in a working state of a radio frequency device are stored in a receiving device in an idle state of another radio frequency device, and are regarded as service data received by the idle receiving set corresponding to the other radio frequency device. Finally, the service data received the receiving sets of two radio frequency devices are transferred together. Similarly, service data received by the receiving sets of multiple radio frequency devices may also be transferred together, thereby reasonably using the limited channel resources of the baseband processing device and well supporting future capacity expansion of a CDMA base station of the carrier frequency with same PN.

It should be noted that in the procedure of moving service data storage, it is not necessary to restrict that service data may be stored in receiving devices corresponding to idle receiving sets of another radio frequency device only after all receiving devices corresponding to idle receiving sets of a radio frequency device are stored with service data received by receiving sets of other radio frequency devices. If the total number of receiving sets in the working state of the radio frequency devices is smaller than the number of receiving sets of a radio frequency device, in such cases, preferably, in the data processing apparatus 20, service data received by the receiving sets in the working state of the radio frequency devices are stored in receiving devices corresponding to receiving sets of a same radio frequency device, so that the service data received by the radio frequency devices are transferred together to the baseband processing device by using a baseband processing device channel corresponding to only one radio frequency device.

If the total number of receiving sets in the working state of the radio frequency devices is greater than the number of receiving sets of a radio frequency device, but is smaller than the minimum integral multiple of the number of the receiving sets of a radio frequency device, where times obtained by dividing the minimum integral multiple by the number of the receiving sets of the radio frequency device is n, in such cases, no matter how the service data are stored in the data processing apparatus 20, n baseband processing device channels are needed to transfer service data received by the radio frequency devices to the baseband processing device. It is unnecessary to restrict service data received by how many receiving sets may be processed by every radio frequency device. For example, a carrier frequency with same PN includes 6 radio frequency devices and every radio frequency device includes 4 receiving sets. When 9 receiving sets of the 4 radio frequency devices are in the working state and receive service data, the 9 receiving sets in the working state are distributed in at least 3 radio frequency devices or even 4, 5, or 6 radio frequency devices. If a solution of the prior art is used, 4, 5, or even 6 baseband processing device channels may be needed to transfer service data received by the receiving sets to the baseband processing device. While in the technical solution of the present application, when data are processed in the data processing apparatus 20, only 3 baseband processing device channels are needed to transfer the service data received by the 9 receiving sets in the working state to the baseband processing device. In such cases, the service data received by the 9 receiving sets may be moved for storage in any way in the data processing apparatus 20, and it is only necessary to ensure that the service data received by the 9 receiving sets are moved to receiving devices respectively corresponding to 3 radio frequency devices, so that the service data received by the 9 receiving sets in the working state may be transferred to the baseband processing device through the baseband processing device channels corresponding to only the 3 radio frequency devices.

By using the technical solution according to the above embodiment, channel resources of the baseband processing device may be effectively saved, thereby facilitating future capacity expansion of a CDMA base station under the carrier frequency with same PN.

Persons of ordinary skill in the art should understand that all or a part of the steps of the method according to the embodiments may be implemented by a program instructing relevant hardware. The program may be stored in a computer readable storage medium. When the program is run, the steps of the method according to the embodiments are performed. The storage medium includes various mediums which are capable of storing program codes, such as a ROM, a RAM, a magnetic disk, or a CD-ROM.

Figure 3:
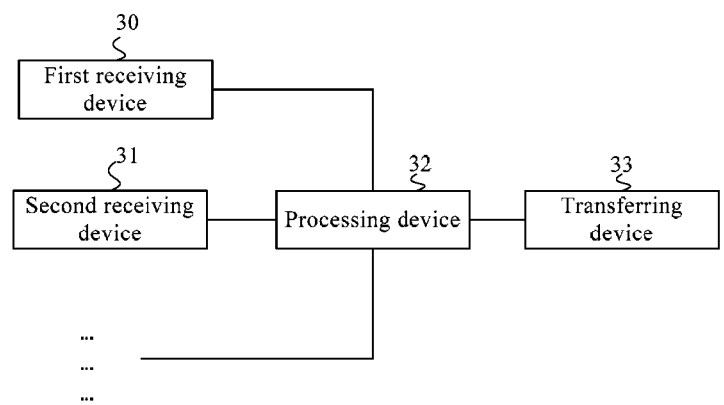
FIG. 3 is a schematic structural diagram of an apparatus for processing data according to an embodiment of the present invention.

FIG. 3 is a schematic structural diagram of an apparatus for processing data according to an embodiment of the present invention. As shown in FIG. 3, the data processing apparatus according to the embodiment includes a first receiving device 30, at least one second receiving device 31, a processing device 32, and a transferring device 33.

The first receiving device 30 is configured to receive first service data sent by a first radio frequency device, where the first service data are received by at least one receiving set of the first radio frequency device. The at least one second receiving device 31 is configured to receive at least one second service data sent by at least one second radio frequency device, where the at least one second service data are respectively received by at least one receiving set corresponding to the at least one second radio frequency device. The processing device 32 is configured to, if there is at least one idle receiving set in the first radio frequency device, merge the at least one second service data with the first service data, so that the at least one second service data are regarded as service data respectively received by the at least one idle receiving set of the first radio frequency device, where the number of the at least one second service data equals to the number of the at least one idle receiving set. The transferring device 33 is configured to transfer the first service data and the at least one second service data to a baseband processing device through a baseband processing device channel corresponding to the first radio frequency device.

The data processing apparatus according to the embodiment is placed between radio frequency devices of a CDMA base station and the baseband processing device. The first receiving device 30 of the data processing apparatus receives the first service data sent by the first radio frequency device, where the first service data are received by the at least one receiving set of the first radio frequency device. The at least one second receiving device 31 of the data processing apparatus receives at least one second service data sent by at least one second radio frequency device, where the at least one second service data are respectively received by at least one receiving set corresponding to the at least one second radio frequency device. The processing device 32 is respectively connected to the first receiving device 30 and the at least one second receiving device 31. If there is at least one idle receiving set in the first radio frequency device, the processing device 32 merges the at least one second service data received by the at least one second receiving device 31, so that the at least one second service data are regarded as service data respectively received by the at least one idle receiving set of the first radio frequency device. Finally, the transferring device 33 transfers the first service data and the at least one second service data to the baseband processing device through the baseband processing device channel corresponding to the first radio frequency device.

The implementation mechanism of the data processing apparatus according to the embodiment is same as the method for processing data according to the above embodiment 1. Relevant description in detail of the above embodiment may be referred to and will not be described repeatedly herein.

The above embodiments involve only the transferring of uplink data from radio frequency devices to a baseband processing device in a CDMA base station. Downlink data from the baseband processing device to the radio frequency devices may be transferred as follows: the baseband processing device sends service data directed to all radio frequency devices to a data processing apparatus through one baseband processing device channel, and then the data processing apparatus sends the service data directed to the radio frequency devices respectively to the radio frequency devices.

The data processing apparatus according to the embodiment, by transferring service data of at least two radio frequency devices to a baseband processing device through a channel corresponding to the same radio frequency device, is capable of effectively using channel resources of the baseband processing device, thereby saving the channel resources of the baseband processing device and facilitating further expanding the capacity of a CDMA base station under the carrier frequency with same PN.

On the basis of the above embodiment, a preferable technical solution is as follows: the processing device 32 is further configured to, when the idle receiving set in the first radio frequency device receives third service data, transfer the first service data and the third service data to the baseband processing device through the baseband processing device channel corresponding to the first radio frequency device.

When one or multiple idle receiving sets of the at least one idle receiving set in the first radio frequency device receive third service data, correspondingly, the second service data which are regarded as received by the idle receiving set cannot be regarded as the service data received by the idle receiving set of the first radio frequency device any longer. For the convenience of description, assume that a receiving set A is an idle receiving set of the first radio frequency device. When the receiving set A is idle, second service data received by a receiving set of a second radio frequency device B are regarded as service data received by the receiving set A, and are transferred to a baseband processing device together through a baseband processing device channel corresponding to the first radio frequency device. When the receiving set A receives third service data, in such cases, the second service data received by the receiving set of the second radio frequency device B cannot be regarded as the service data received by the receiving set A of the first radio frequency device. The data processing apparatus transfers the first service data and the third service data together to the baseband processing device through the baseband processing device channel corresponding to the first radio frequency device.

After the processing mentioned above, if there is an idle receiving set still in the first radio frequency device, the processing in the embodiment 3 mentioned above is performed.

On the basis of the above embodiment, another preferable solution is that the processing device 32 is configured to, if there is at least one idle receiving set in a first radio frequency device, merge the at least one second service data with first service data. Specifically, the processing device 32 is configured to, if there is at least one idle receiving set in the first radio frequency device, store the at least one second service data received in the receiving device respectively corresponding to the at least one receiving set of the at least one second radio frequency device in the receiving device respectively corresponding to the at least one idle receiving set of the first radio frequency device, and regard the same as service data respectively received by the at least one idle receiving set of the first radio frequency device.

Specifically, for the convenience of understanding, in the data processing apparatus, the service data which are sent by the radio frequency devices and which are received by each receiving set of the radio frequency devices are stored in a corresponding receiving device. In other words, the data processing apparatus has one receiving device corresponding to every receiving set of every radio frequency device. However, the receiving device corresponding to the at least one receiving set receives corresponding service data only when the at least one receiving set of the radio frequency device receives the service data. For example, if there is at least one idle receiving set in the first radio frequency device, the processing device 32 stores the at least one second service data received in a receiving device respectively corresponding to the at least one receiving set of the at least one second radio frequency device into a receiving device respectively corresponding to the at least one idle receiving set of the first radio frequency device, thereby regarding the same as the service data respectively received by the at least one idle receiving set of the first radio frequency device. In such cases, the at least one second service data and the first service data are merged in the receiving device corresponding to the first radio frequency device. The description in the embodiment 2 mentioned above may be referred to for details and will not be described repeatedly herein.

By using the technical solution according to the embodiment, a location for storing service data in a data processing apparatus may be adjusted to effectively use channel resources of a baseband processing device, thereby facilitating further expanding the capacity of a CDMA base station under the carrier frequency with same PN.

Figure 4:
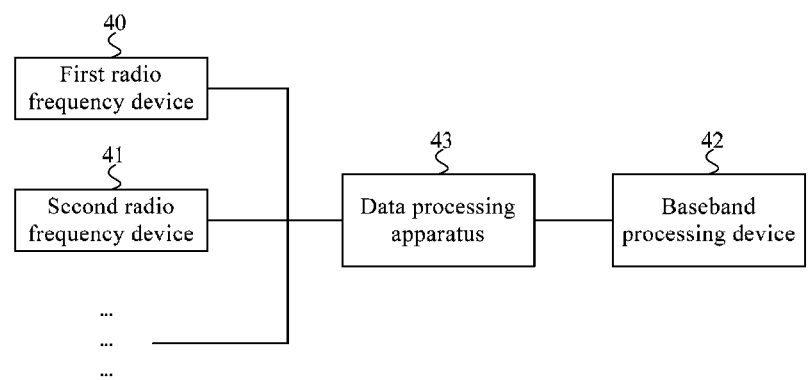
FIG. 4 is a schematic structural diagram of a base station according to an embodiment of the present invention.

FIG. 4 is a schematic structural diagram of a base station according to an embodiment of the present invention. As shown in FIG. 4, the base station according to the embodiment includes a first radio frequency device 40, at least one second radio frequency device 41, a baseband processing device 42, and a data processing apparatus 43.

As shown in FIG. 4, the data processing apparatus 43 is respectively connected to the first radio frequency device 40, the at least one second radio frequency device 41, and the baseband processing device 42. The data processing apparatus 43 receives first service data sent by the first radio frequency device 40, where the first service data are received by at least one receiving set of the first radio frequency device 40. The data processing apparatus 43 also receives at least one second service data sent by at least one second radio frequency device 41, where the at least one second service data are respectively received by at least one receiving set corresponding to the at least one second radio frequency device 41. If there is at least one idle receiving set in the first radio frequency device 40, the data processing apparatus 43 merges the at least one second service data with the first service data, so that the at least one second service data are regarded as service data respectively received by the at least one idle receiving set of the first radio frequency device 40, where the number of the at least one second service data equals to the number of the at least one idle receiving set. Then, the data processing apparatus 43 transfers the first service data and the at least one second service data to the baseband processing device 42 through the baseband processing device channel corresponding to the first radio frequency device 40.

In the base station according to the embodiment, the first radio frequency device 40 receives the first service data through the at least one receiving set. The at least one second radio frequency device 41 respectively receives the at least one second service data through corresponding receiving sets. Then, the first radio frequency device 40 sends the first service data to the data processing apparatus 43, and the at least one second radio frequency device 41 also respectively sends the at least one second service data to the data processing apparatus 43. If there is at least one idle receiving set in the first radio frequency device 40, the data processing apparatus 43 merges the at least one second service data sent by the at least one second radio frequency device 41 with the first service data, thereby regarding the at least one second service data as service data received by the at least one idle receiving set of the first radio frequency device 40. The data processing apparatus 43 transfers the first service data and the at least one second service data to the baseband processing device 42 through the baseband processing device channel corresponding to the first radio frequency device 40.

In the embodiment, channel resources between the data processing apparatus 43 and the first radio frequency device 40, and between the data processing apparatus 43 and the at least one second radio frequency device 41 are unlimited, while channel resources between the data processing apparatus 43 and the baseband processing device 42 are limited. By using the solution according to the embodiment, channel resources between the data processing apparatus 43 and the first radio frequency device 40, and between the data processing apparatus 43 and the at least one second radio frequency device 41 increased; however, the limited baseband processing device channel resources between the data processing apparatus 43 and the baseband processing device 42 may be effectively used.

The base station according to the embodiment is capable of effectively using channel resources of a baseband processing device, thereby saving the channel resources of the baseband processing device and facilitating further expanding a capacity of the base station under a carrier frequency with same PN.

Figure 5:
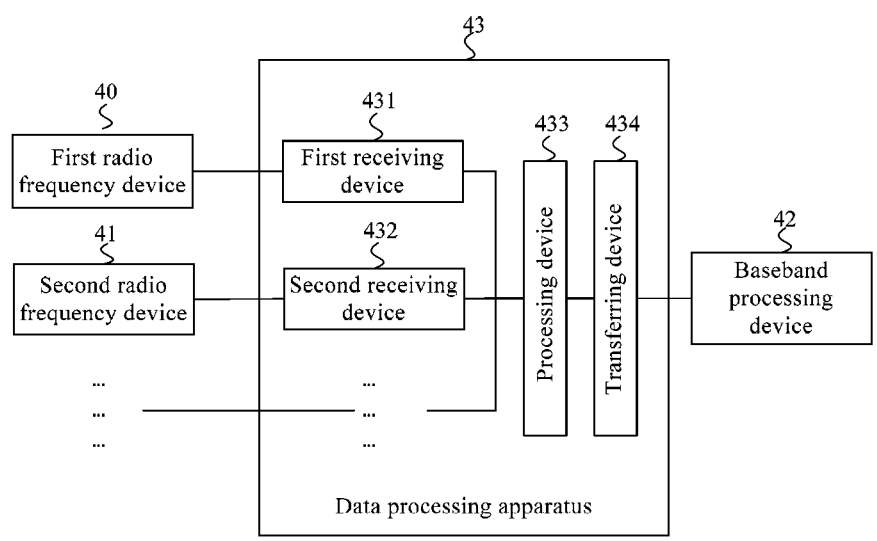
FIG. 5 is a schematic structural diagram of another base station according to an embodiment of the present invention.

FIG. 5 is a schematic structural diagram of another base station according to an embodiment of the present invention. As shown in FIG. 5, on the basis of the embodiment shown in FIG. 4, the data processing apparatus 43 in the base station according to this embodiment may specifically include a first receiving device 431, at least one second receiving device 432, a processing device 433, and a transferring device 434.

The first receiving device 431 receives first service data sent by a first radio frequency device 40, where the first service data are received by at least one receiving set of the first radio frequency device 40. The at least one second receiving device 432 receives at least one second service data sent by at least one second radio frequency device 41, where the at least one second service data are respectively received by at least one receiving set corresponding to the at least one second radio frequency device 41. The processing device 433 is configured to, if there is at least one idle receiving set in the first radio frequency device 40, merge the at least one second service data with the first service data, so that the at least one second service data are regarded as service data respectively received by the at least one idle receiving set of the first radio frequency device 40. The transferring device 434 transfers the first service data and the at least one second service data to a baseband processing device 42 through a baseband processing device channel corresponding to the first radio frequency device 40.

In the embodiment, the first receiving device 431 is connected to the first radio frequency device 40 and receives the first service data sent by the first radio frequency device 40. The at least one second receiving device 432 is respectively connected to the at least one second radio frequency device 41 and receives the at least one second service data sent by the at least one second radio frequency device 41. The processing device 433 is respectively connected to the first receiving device 431, the at least one second receiving device 432, and the baseband processing device 42. If there is at least one idle receiving set in the first radio frequency device 40, the processing device 433 merges the at least one second service data received in the at least one second receiving device 432 with the first service data received by the first receiving device 431, thereby regarding the at least one second service data as service data respectively received by the at least one idle receiving set of the first radio frequency device 40. Then, the first service data received by the first receiving device 431 and the at least one second service data received by the at least one second receiving device 432 are transferred to the baseband processing device 42 through the baseband processing device channel of the first radio frequency device 40.

The data processing apparatus 43 in the base station according to the embodiment may use the data processing apparatus described in the embodiment 3 mentioned above, and the embodiment 3 may be referred to for detailed description and will not be described repeatedly herein.

The base station according to the embodiment is capable of effectively using channel resources of a baseband processing device, thereby saving the channel resources of the baseband processing device and facilitating further expanding a capacity of the base station under a carrier frequency with same PN.

On the basis of the above embodiment, when the processing device 433 is further configured to, when the idle receiving set in the first radio frequency device 40 receives third service data, transfer the first service data received by the first receiving device 431 and the third service data to the baseband processing device 42 through the baseband processing device channel corresponding to the first radio frequency device 40.

On the basis of the above embodiment, another preferable solution is as follows: the processing device 433 is specifically configured to, if there is at least one idle receiving set in the first radio frequency device 40, store the at least one second service data in a receiving device respectively corresponding to the at least one idle receiving set of the first radio frequency device 40, thereby regarding the same as service data respectively received by the at least one idle receiving set of the first radio frequency device 40; and transfer the first service data and the at least one second service data to the baseband processing device 42 through the baseband processing device channel corresponding to the first radio frequency device 40.

The implementation mechanisms of the above two preferable technical solutions are same as the embodiment 3 mentioned above, and detailed description of the embodiment 3 may be referred to and will not be described repeatedly herein.

The apparatus embodiment described above is merely illustrative, where the units described as separate components may be or may be not physically separate, and the components displayed as units may be or may be not physical units, and may be located in one place or be distributed on at least two network units. Part or all devices may be selected depending on the actual requirements to realize the objectives of the solutions according to the embodiments, which can be understood and implemented by persons of ordinary skill in the art without creative efforts.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications may be made to the technical solutions described in the embodiments, or equivalent replacements may be made to some technical features in the technical solutions; however, such modification or replacement does not make the essence of corresponding technical solutions exceed the spirit and scope of the technical solutions according to the embodiments of the present invention.

What is claimed is:

1. A method for processing data, comprising:
   receiving, by a receiving set of a plurality of receiving sets corresponding to a first radio frequency device, a first service data;
   receiving, by a receiving set corresponding to a second radio frequency device, a second service data; and
   transferring, through a same channel of a baseband processing device corresponding to the first radio frequency device, the first service data and the second service data to the baseband processing device;
   wherein the second service data is regarded as service data received by an idle receiving set, which is not currently being used for receiving first service data, of the plurality of receiving sets of the first radio frequency device.

2. The method for processing data according to claim 1, wherein before transferring, by a baseband processing device channel corresponding to the first radio frequency device, the first service data and the second service data to the baseband processing device corresponding to the first radio frequency device, the method further comprises:

merging the second service data with the first service data, so that the second service data is regarded as service data received by an idle receiving set which is not currently being used for receiving the first service data of the plurality of receiving sets of the first radio frequency device.

3. The method for processing data according to claim 2, wherein before transferring, by a baseband processing device channel corresponding to the first radio frequency device, the first service data and the second service data to a baseband processing device corresponding to the first radio frequency device, the method further comprises:

storing the second service data into a first receiving device corresponding to the first radio frequency device, so that the second service data is regarded as service data received by the idle receiving set which is not currently being used for receiving the first service data of the plurality of receiving sets of the first radio frequency device.

4. The method for processing data according to claim 1, wherein the second radio frequency device is a radio frequency device whose reverse time delay is closest to the first radio frequency device.

5. The method for processing data according to claim 1, wherein the second radio frequency device is selected according to a reverse time delay to the first radio frequency device in an increasing sequence.

6. An apparatus for processing data, comprising:
a first receiving device corresponding to a receiving set of a plurality of receiving sets of a first radio frequency device, configured to receive a first service data;
a second receiving device corresponding to a receiving set of a second radio frequency device, configured to receive a second service data; and
a transferring device configured to transfer the first service data and the second service data to a baseband processing device through a same channel of the baseband processing device corresponding to the first radio frequency device;
wherein the second service data is regarded as service data received by an idle receiving set, which is not currently being used for receiving first service data, of the plurality of receiving sets of the first radio frequency device.

7. The apparatus for processing data according to claim 6, wherein the apparatus further comprises:
a processing device, configured to merge the second service data with the at least first service data, so that the second service data is regarded as service data respectively received by the idle receiving set which is not currently being used for receiving the first service data of the plurality of receiving sets of the first radio frequency device.

8. The apparatus for processing data according to claim 6, wherein the apparatus further comprises:
a processing device, configured to:
store the second service data into a first receiving device corresponding to the first radio frequency device, so that the second service data is regarded as service data received by the idle receiving set which is not currently being used for receiving the first service data of the plurality of receiving sets of the first radio frequency device.

9. A base station, comprising a data processing apparatus and a non-transitory computer readable medium including computer-executable instructions the data processing apparatus being configured to be in communication with a first radio frequency device, a second radio frequency device and a base band processing device, wherein the data processing apparatus is configured to execute the computer-executable instructions to perform the method including:

receiving a first service data sent by the first radio frequency device, wherein the first service data are is received by a receiving set of a plurality of receiving sets corresponding to the first radio frequency device;

receiving a second service data sent by the second radio frequency device, wherein the second service data is received by a receiving set corresponding to the second radio frequency device, and the second service data is regarded as service data received by an idle receiving set, which is not currently being used for receiving the first service data, of the plurality of receiving sets corresponding to the first radio frequency device; and transferring the first service data and the second service data to the baseband processing device through a same channel of the baseband processing device corresponding to the first radio frequency device.

10. The base station according to claim 9, wherein the data processing apparatus is further configured to merge the second service data with the first service data, so that the second service data is regarded as service data respectively received by the idle receiving set which is not currently being used for receiving the first service data of the plurality of receiving sets of the first radio frequency device.

11. The base station according to claim 9, wherein the data processing apparatus is further configured to store the second service data into a first receiving device corresponding to the first radio frequency device, so that the at least one second service data is regarded as service data received by the idle receiving set which is not currently being used for receiving the first service data of the plurality of receiving sets of the first radio frequency device.

* * * * *